(No Model.)
S. SHERMAN.
CARVING DISH ATTACHMENT.
No. 591,243.  Patented Oct. 5, 1897.
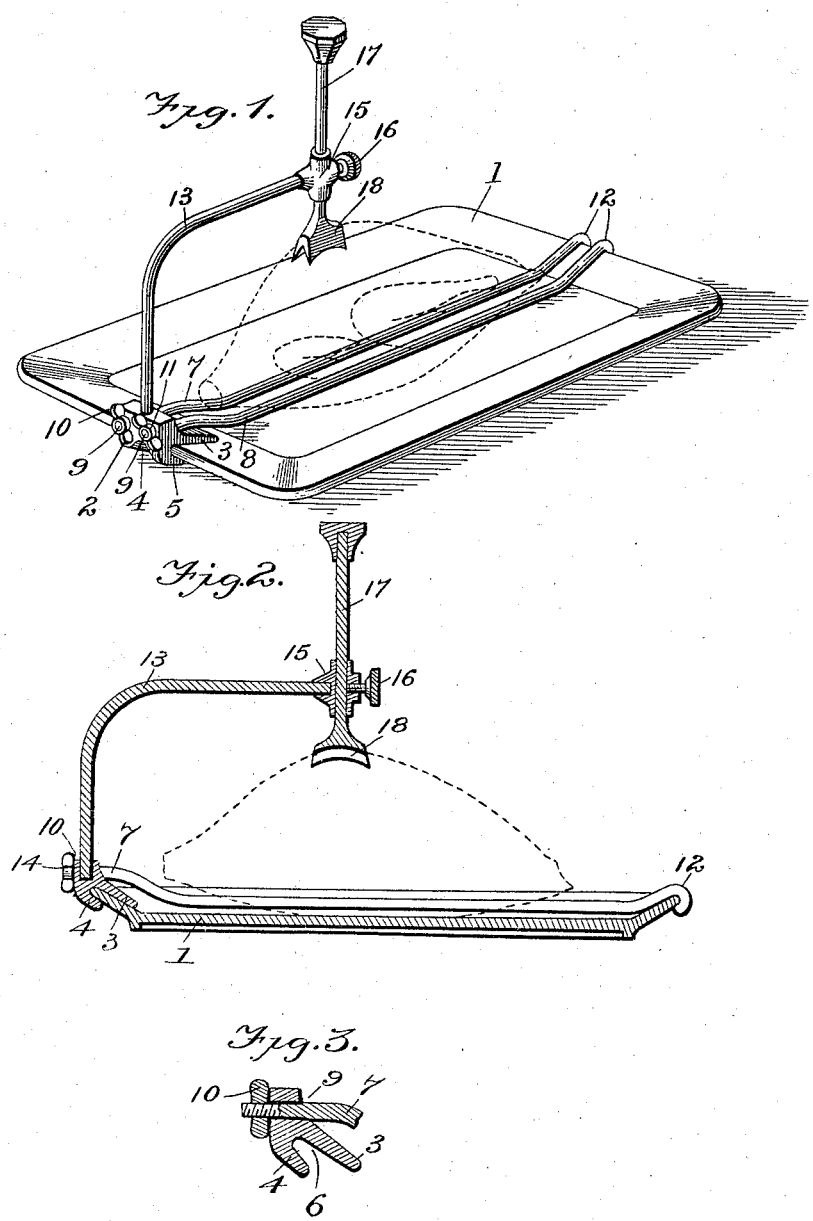
WITNESSES
Edwin G. McKee
J. C. Tappan
INVENTOR
Samuel Sherman.
by John Wedderburn
Attorney

UNITED STATES PATENT OFFICE.

SAMUEL SHERMAN, OF EASTON, MARYLAND.

CARVING-DISH ATTACHMENT.

SPECIFICATION forming part of Letters Patent No. 591,243, dated October 5, 1897.

Application filed September 17, 1896. Serial No. 606,129. (No model.)

*To all whom it may concern:*

Be it known that I, SAMUEL SHERMAN, a citizen of the United States, residing at Easton, in the county of Talbot and State of Maryland, have invented certain new and useful Improvements in Carving-Dish Attachments; and I do hereby declare the following to be a full, clear, and exact description of the invention, such as will enable others skilled in the art to which it appertains to make and use the same.

My invention relates to carving-dish attachments.

My object is to provide an improved and simple device which can be used with any carving-dish or platter, and is adapted to firmly hold or secure on the latter the fowl, meat, or other article of food which is to be carved, so that the annoyance heretofore experienced by the moving about of the food on the platter during the carving operation will be satisfactorily obviated.

Having this object in view my invention consists of a novel securing device adapted for attachment to a carving-dish or platter, and which comprises certain improved features and novel combinations of parts appearing more in detail hereinafter.

In the accompanying drawings, Figure 1 is a perspective view showing my improved device in use; Fig. 2, a longitudinal sectional view, and Fig. 3 a sectional detail view of a certain improved clamping-block and a portion of a rest secured thereto.

The numeral 1 designates a platter or carving-dish of ordinary construction. I employ a clamping-block 2, which is provided with an inclined broad lip 3 and two fingers 4 and 5, thereby providing a recess or notch 6, in which the edge of the platter is received, the lip being on top of the edge and the fingers underneath. There are two parallel separated rods 7 and 8, which are duplicates. The ends 9 of the rods pass through the clamping-block and are screw-threaded. Nuts 10 and 11 are received on the screw-threaded ends of said rods and prevent them from moving. The rods are bent to conform to the platter or carving-dish, as shown, and each rod has a hooked end 12, which straddles the opposite end of the carving-dish or platter from where the clamping-block is located. It will thus be seen that by loosening the nuts the clamping-block can be adjusted on the rods so that the device can be applied to platters or carving-dishes of different lengths.

The numeral 13 designates a supporting-bar which has one end seated in and secured to the clamping-block, as shown at 14. This supporting-rod first extends vertically and then horizontally in substantially parallel relation to the platter. On the outer end of said rod there is located a coupling which has a vertically-extending sleeve 15, and 16 designates a thumb-screw which works in said sleeve.

The numeral 17 designates a securing-rod which is movable in the sleeve and is provided at its lower end with a fork 18, that has a V-shaped notch adapted to straddle the breast-bone of the fowl should such be the article undergoing the carving operation.

When in use, the fowl is pressed in between the two rods 7 and 8, which serve as a rest. The securing-rod is then forced downward until the fork enters the fowl, and the thumb-screw can then be clamped against the securing-rod, whereupon the fowl will be held rigid in relation to the dish and can be easily carved.

It is obvious that the device can be used in connection with roasts or any kind of meat adapted for carving, as well as other articles of food.

Although it is not necessary, yet I find it advantageous to notch the edges of the platter or carving-dish for the reception of the hooked ends 12 and also to receive the clamping-block, so that the attachment will be more firmly secured to the dish.

In an application filed by me June 27, 1896, and which bears Serial No. 597,162, I have shown, described, and claimed a supporting-rod secured to a carving-dish or platter used in connection with a securing-rod and a thumb-screw substantially the same as shown and described in the present application, and hence it is to be understood that I do not now make claim to said parts by themselves.

There are many slight and immaterial changes that might be resorted to in constructing the different parts of the present invention without detracting from any of their advantages, and hence it is to be understood that I do not limit myself to the precise construction herein shown and described, but consider that I am entitled to all such variations as properly come within the spirit and scope of the invention.

Having thus described my invention, what I claim as new, and desire to secure by Letters Patent, is—

1. In an attachment for carving-dishes, the combination with a clamping-block adapted to engage with one portion of the dish, of a rest comprising separated parallel bars having portions hooked and engaging with the dish, and an adjustable connection between the rest and the block, the article to be carved being received between the parallel bars.

2. In an attachment for carving-dishes, the combination with a clamping-block adapted to engage with the carving-dish, of a rest having a portion adapted to engage with the carving-dish and provided with a screw-threaded projection which passes through the clamping-block, and a clamping-nut receiving the said screw-threaded projection.

3. In an attachment for carving-dishes, the combination with a clamping-block having arms which straddle the edge of the carving-dish, of a rest comprising separated parallel bars lying adjacent to the dish and provided with hooked ends which engage with the latter, said bars having screw-threaded portions which pass through the clamping-block, and thumb-nuts located on said screw-threaded portion.

In testimony whereof I have signed this specification in the presence of two subscribing witnesses.

SAMUEL SHERMAN.

Witnesses:
MARTIN M. WRIGHT,
ROBERT F. WALKER.